United States Patent
Nakada et al.

(10) Patent No.: US 6,688,424 B1
(45) Date of Patent: Feb. 10, 2004

(54) NOISE ABSORBING DEVICE AND DEVICE FOR TAKING AIR INTO ENGINE ROOM OF A CONSTRUCTION MACHINE

(75) Inventors: Kuniaki Nakada, Yokohama (JP); Kazuya Imamura, Fujisawa (JP); Masahiro Ikeda, Chigasaki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/176,671

(22) Filed: Oct. 21, 1998

(30) Foreign Application Priority Data

Oct. 24, 1997 (JP) .............................. 9-310043
Feb. 17, 1998 (JP) .............................. 10-51470

(51) Int. Cl.$^7$ .......................... E04F 17/04; B60K 11/00
(52) U.S. Cl. ...................... 181/224; 181/225; 181/264; 181/204; 180/68.1
(58) Field of Search ................... 181/224, 225, 181/214, 222, 264, 204; 180/68.1, 68.3

(56) References Cited

U.S. PATENT DOCUMENTS

| | | | | |
|---|---|---|---|---|
| 3,478,958 A | * | 11/1969 | Hinck, III et al. ........... 181/200 |
| 3,762,489 A | * | 10/1973 | Proksch et al. ............. 180/68.1 |
| 3,820,629 A | * | 6/1974 | Carlson et al. ............. 181/290 |
| 3,857,453 A | * | 12/1974 | Buttke et al. .............. 180/68.1 |
| 3,897,850 A | * | 8/1975 | Thompson et al. .......... 181/204 |
| 3,923,114 A | * | 12/1975 | Suzuki ...................... 180/68.1 |
| 4,020,900 A | * | 5/1977 | Kitagawa ................... 180/68.1 |
| 4,116,269 A | * | 9/1978 | Ikeda ........................ 181/224 |
| 4,169,501 A | * | 10/1979 | Takeuchi et al. ............ 181/224 |
| 4,260,037 A | * | 4/1981 | Eline ......................... 181/204 |
| 4,334,588 A | * | 6/1982 | Tezuka et al. ............. 180/68.6 |
| 4,537,278 A | * | 8/1985 | Okada et al. .............. 181/264 |
| 4,771,844 A | * | 9/1988 | Bassett ..................... 180/68.1 |
| 5,036,931 A | * | 8/1991 | Iritani ....................... 180/68.1 |
| 5,199,522 A | | 4/1993 | Martenas et al. .......... 180/68.3 |
| 5,473,124 A | * | 12/1995 | Yazici et al. ................ 181/224 |
| 5,625,172 A | * | 4/1997 | Blichmann et al. ......... 181/204 |

FOREIGN PATENT DOCUMENTS

| | | | |
|---|---|---|---|
| DE | 24 24 968 A1 | 5/1975 | |
| JP | 52045901 A | * 4/1977 | .......... G10K/11/02 |
| JP | 52046508 A | * 4/1977 | .......... F01N/1/10 |
| JP | 56-116520 | 9/1981 | |
| JP | 57-137616 | 8/1982 | |
| JP | 63120809 A | * 5/1988 | .......... F01N/1/10 |
| JP | 64-1150 | 1/1989 | |
| JP | 01275221 A | * 11/1989 | .......... B60K/11/04 |
| JP | 6-144022 | 5/1994 | |

* cited by examiner

*Primary Examiner*—Robert E. Nappi
*Assistant Examiner*—Edgardo San Martin
(74) *Attorney, Agent, or Firm*—Sidley Austin Brown & Wood LLP

(57) ABSTRACT

An engine noise reduction device to reduce sound output from an engine compartment and supply cooling air to the engine compartment to increase cooling efficiency and prevent engine and component overheating. The device opposes a plurality of air inlets, to receive an air flow therefrom, and includes a split-type noise absorbing portion and a cell-type noise absorbing portion.

19 Claims, 16 Drawing Sheets

NOISE ABSORBING DEVICE AND DEVICE FOR TAKING AIR INTO ENGINE ROOM OF A CONSTRUCTION MACHINE

FIELD OF THE INVENTION

The present invention relates to an engine noise reduction device, and in particular, to an engine noise reduction device for a construction machine which further increases the quantity of air supplied to an engine compartment to prevent engine and equipment overheating.

BACKGROUND OF THE INVENTION

Conventionally, there have been various proposals regarding a noise absorbing device for reducing noise in an engine room. The following inventions are known as art close to the present invention:

(1) According to Japanese laid-open Patent No. 57-137616, cooling air discharged by a cooling fan of an engine passes through a sound deadening louver device of a radiator guard after cooling a radiator and is discharged into a space formed between the louver and a radiator silencer device. Part of the cooling air exhaust is discharged from an discharge port at the upper portion of the space, and the remaining portion of the exhaust is discharged to an engine air flow guiding passage of a dual structure connected to the lower portion of the space. A switch device is provided at the terminal end of the air flow guiding passage, and by operating an open-close plate, cooling air exhaust is returned to an engine room through an exit to enhance sound deadening effect, or cooling air exhaust is discharged to the outside to enhance cooling effect.

However, according to the above configuration, the sound deadening effect and the cooling effect are enhanced by operating the open-close plate in accordance with operational conditions; therefore, operation is troublesome. In addition, hot air is returned and circulated when the open-close plate is closed; thus, there is a disadvantage of reducing the cooling effect.

(2) According to Japanese Laid-open Patent No. 56-116520, each of a plurality of noise absorbing louvers is tilted so that the front edge thereof is higher than the rear edge thereof. As a result, a space between a pair of adjacent noise absorbing louvers form an air exhaust passage facing diagonally upward to the front of a vehicle. Thereby noisy air discharged from an engine room by a cooling fan is not discharged to the front of the vehicle but collides against the noise absorbing louvers once through a noise absorbing grille, and the noise and speed of the air is reduced. Thereafter, the noisy air is discharged along the passage to a portion above the vehicle. As a result, the noisy air discharged from the noise absorbing grille dose not scatter lightweight material such as fine coal, chips, or the like carried in the vehicle and placed in front of the noise absorbing grille.

However, according to the above configuration, each of the noise absorbing louvers is placed to face diagonally upward so that fine coal, chips, or the like are not scattered upward by the exhaust, but there is no particular advantage when it is applied to an air inlet portion. Especially it is difficult to apply this configuration to a vehicle with a structure which cannot secure a sufficient inlet area only with an air inlet portion in one direction and needs to provide air inlet portions in two different directions.

(3) According to Japanese Laid-open Utility Model No. 64-1150, both side portions of a plurality of noise absorbing louvers placed in parallel are respectively coupled with pins and the inclinations of the noise absorbing louvers are changed, thereby the space between adjacent louvers is adjustable. As a result, when a construction vehicle loses heat balance during operation, flow resistance of cooling air can be reduced by increasing the space between the noise absorbing louvers. When noises are to be reduced, the space can be reduced by tilting the noise absorbing louvers, and engine noises can be released upward.

However, according to the above configuration, it is necessary to operate the noise absorbing louvers respectively to reduce engine noise or to enhance engine cooling, thus the system is inconvenient. In addition, as in the previous invention, it is difficult to apply this configuration to air inlet portions in two different directions.

(4) Japanese Laid-open Patent No. 6-144022 provides a configuration of a traveling working vehicle in which exhaust from an opening portion of a radiator is discharged from an engine bonnet. A splitter sound deadening device is placed in close contact with the opening portion of the radiator and is attached at the engine bonnet side to prevent a cooling air flow from circulating in the engine bonnet. Moreover, the radiator is placed so that the axis of a cooling fan is at a position higher than the axis of a cooling pump so that the exhaust from the opening portion of the radiator is discharged lower than the splitter sound deadening device.

According to the above configuration, the splitter sound deadening device is in close contact with the opening portion of the radiator and is attached at the engine bonnet side to prevent a cooling air flow from circulating in the engine bonnet; therefore, it is difficult to apply this configuration to air inlet portions to take air in from two different directions.

Recently, ultra-small, revolving-type hydraulic shovels, which can revolve within the width of a crawler belt, are mainly used in operational sites. For these hydraulic shovels, the size of the upper revolving superstructure is reduced. Consequently, the volume of an engine room which houses an engine, a radiator, a fan, hydraulic instruments, and the like is decreased. In FIGS. 25 and 26, an upper revolving superstructure 151 is composed of a working machine 152, a driver's cabin 153, an engine room 111, and the like, and can revolve within the width of a crawler belt 155. In this downsized ultra-small, revolving-type hydraulic shovel 150, a single intake port for supplying cooling air flow to cool a radiator (not illustrated) housed in the inner side of the engine room 111 and an engine (not illustrated) is too limited, and an insufficient quantity of cooling air flow would be supplied. Therefore, a device 110 for supplying air to an engine room having a plurality of air intake ports 122 and 127 supplies cooling air flow to the radiator to cool the engine. As a result, for a plurality of air intake ports 122 and 127, air is mainly supplied through a counterweight 121 (composing the engine room 111) having the intake port 122, and a shortage amount is supplied through the air intake port 127 extending through an engine hood 126 at the upper side of the engine room 111. Alternatively, air is mainly supplied through the counterweight 121, and a shortage amount is supplied from a space at an upper revolving superstructure frame 112 at the lower side of the engine room 111.

However, in the hydraulic shovel 150 or the like, it is found that even if a plurality of intake ports 122 and 127 (which intersect at a right angle) are provided, the quantity of air supplied is not increased. Explaining, for example, with reference to FIG. 19, a change in the quantity of intake air is achieved by changing an opening area An of the auxiliary hood inlet port 127, provided at an engine hood 126, to take in the shortage air flow amount, while an opening area Ac at the major counterweight inlet port 122, provided at the counterweight 121, is fixed. As a result, as shown in FIG. 22, it is found that if auxiliary air quantity Va from the auxiliary hood inlet port 127 is increased, major air quantity Vm from the major counterweight inlet port 122 decreases following the increase, and total air quantity Vc as a whole increases only a little. On the other hand, if the opening area An of the auxiliary hood inlet port 127 is fixed and the opening area Ac of the major counterweight inlet port 122 is changed, the same result is obtained, specifically, the total air quantity Vc as a whole increases only a little. The reason for the above result is considered to be that the air from the major counterweight inlet port 122 and the air from the auxiliary hood inlet port 127 interfere with each other at a position where the respective air flows intersect. Consequently, such disturbance within the combined air flow prevents the total air quantity Vc of the two ports from increasing.

SUMMARY OF THE INVENTION

The present invention is made to eliminate the above disadvantages of the prior art, and its first object is to provide a noise absorbing device having greater sound deadening effect and greater cooling effect with smaller air flow resistance. A second object of the invention is to provide a device to supply air to an engine room of a construction machine which increases the quantity of air supplied from two air intake ports with a simple configuration and which effectively cools an engine room.

A first aspect of an air absorbing device of the present invention is a noise absorbing device which is placed at an air inlet portion of a wall surface of an engine room and reduces engine noise. The first aspect is characterized by being placed opposite a plurality of air inlet portions formed in the wall surfaces at least at two different locations (i.e., directions) of the engine room. This aspect further includes a split-type noise absorbing device provided to oppose the air inlet portion at the wall surface in one direction, where such device has a portion with an air passage of a longer length, and a cell-type noise absorbing device provided to oppose the air inlet portion at the wall surface in the other direction, where such device has a portion with an air passage of a shorter length.

According to the above configuration, the split-type noise absorbing device has an air passage of a longer length; therefore, noise is sufficiently absorbed while passing therethrough, and air flow resistance is less. The cell-type noise absorbing device has an air passage of a shorter length, but it has larger noise absorbing blade surface area relative to the quantity of passing air flow; therefore, noise is sufficiently absorbed. Thus, the split-type noise absorbing device and the cell-type noise absorbing device have almost the same noise absorbing performance. Accordingly, sound deadening effect is achieved even when air is supplied from two different directions, and sufficient air flow is achieved while air flow resistance is smaller, whereby greater cooling is obtained.

The split-type noise absorbing device and the cell-type noise absorbing device may include noise absorbing blades integrally formed of a rigid noise absorbing material. According to the above configuration, the noise absorbing blade is integrally formed of rigid noise absorbing material (for example, rigid sponge or the like); therefore, excellent noise absorbing performance can be obtained.

Further, the split-type noise absorbing device and the cell-type noise absorbing device may include the noise absorbing blades which are formed by adhering the noise absorbing material on both surfaces of a core material having sound insulating properties or air permeability. According to the above configuration, bending strength is increased, and such noise absorbing blade is easily manufactured.

Furthermore, the split-type noise absorbing device and the cell-type noise absorbing device may include noise absorbing blades which are formed by covering the noise absorbing material with plate material having air permeability. According to this configuration, the noise absorbing material is covered with a plate material having air permeability; therefore, a selection range of the noise absorbing material is enlarged, and the strength of the noise absorbing blade is increased.

A second aspect of a noise absorbing device according to the present invention is a noise absorbing device which is placed at an air inlet portion provided at a wall surface of an engine room of a construction machine and reduces noise in an engine. The second aspect is characterized by being placed to oppose a plurality of the air inlet portions provided at the side surface and the top surface of the engine room. This aspect further includes a split-type noise absorbing device, provided at the lower portion side to oppose the side surface air inlet portion, having a plurality of vertically-oriented, parallel noise absorbing blades and a portion with an air passage of a longer length, and a cell-type noise absorbing device, provided at the upper portion side to oppose said top surface air inlet portion, having a plurality of noise absorbing blades placed in parallel and a portion with an air passage of a shorter length. In particular, a width of each noise absorbing blade of the cell-type noise absorbing device is less than a width of a noise absorbing blade of the split-type noise absorbing device.

The above configuration is appropriate where a counterweight is provided at an engine room (for example, as in an upper revolving superstructure of a hydraulic shovel) and sufficient inlet area cannot be achieved with a port in only one direction, and air may be supplied from two directions—from an upper surface and a side surface. In addition, the width of the noise absorbing blade of the cell-type noise absorbing device is smaller than the width of the noise absorbing blade of the split-type noise absorbing device but the device is a cell type; therefore, the surface area of the noise absorbing blade relative to the quantity of passing air flow of the cell-type noise absorbing device is increased so that greater sound deadening effect is obtained. Accordingly, excellent cooling performance and sound deadening performance can be obtained while necessary weight for the counterweight is secured.

Further, each of the widths of a plurality of noise absorbing blades of the split-type noise absorbing device is successively changed in accordance with a round shape of the external perimeter of the engine room with respect to a plan view. Moreover, each pitch between each pair of blades of the split-type noise absorbing device may be an irregular pitch, proportional to each of the changed widths.

According to the above configuration, the device is applicable to a vehicle body with an engine room in a round shape as in the upper revolving superstructure of a hydraulic shovel. By adopting irregular pitches, the pitches between the noise absorbing blades having a smaller width are made smaller; therefore, the surface area of the noise absorbing blade for these portions relative to the quantity of passing air flow is increased. As a result, the noise absorbing effect at the portions having a smaller width is increased, and the noise absorbing performance can be almost the same as the other portions; therefore, the sound deadening effect as a whole is increased.

Each of the aforesaid irregular pitches and each pitch of a vertical grid of an exterior grille of the engine room may be conformed to each other. According to this configuration, air flows smoothly, and air resistance is reduced to increase cooling efficiency.

Each width of a plurality of noise absorbing blades of the split-type noise absorbing device is successively changed in accordance with a round shape of the external perimeter of the engine room, whereby each pitch between a plurality of the noise absorbing blades of the split-type noise absorbing device is a constant pitch, and portions with smaller widths out of said changed widths may have an irregular cell configuration having cells the number of which increases in reverse proportion to each width.

According to the above configuration, the number of cells is increased in reverse proportion to the width of the noise absorbing blade of the split-type noise absorbing device; therefore, the surface area of the noise absorbing blades with a smaller width is increased relative to the quantity of passing air flow. Thereby, the sound deadening effect for the portions with a smaller width is enhanced, and such portions exhibit almost the same noise absorbing performance of the other portions.

A first aspect of a device for taking air into an engine room of a construction machine according to the present invention includes a fan placed in an engine room, at least two air intake ports provided at the engine room or in the vicinity of said engine room and intersecting at a right angle, and a passage, which is provided in front of a radiator, and through which air attracted by the fan from the air intake ports flows toward the radiator. The passage is provided with an air flow stopping plate. The air flow stopping plate divides the passage into a passage through which air attracted from one of the air intake ports flows and a passage through which air attracted from the other of the air intake ports flows. The air flow stopping plate further prevents a collision between the air flowing from the two air intake ports.

According to the above configuration, the air flow stopping plate is provided in the passage and divides the passage into two passages, thereby air respectively supplied from the two air intake ports intersect at a right angle; however, the air flows do not interfere with each other. Consequently, the quantity of air supplied from the two air intake ports respectively increases, and the interior of the engine room is better cooled by a larger quantity of air and is cooled more efficiently. Accordingly, the quantity of air can be increased; therefore, despite an engine room of a construction machine being smaller, overheating can be effectively avoided, whether in regard to an engine, hydraulic devices, or the like which are provided within the engine room. In addition, for such a simple configuration, the engine room can be made smaller at a lower cost.

A second aspect of a device for taking air into an engine room of a construction machine includes a fan placed in an engine room, two opposing air intake ports provided at the engine room or in the vicinity of the engine room, and a passage, which is provided in front of a radiator, and through which air attracted by the fan from the air intake ports flows toward the radiator. The passage is provided with a air flow stopping plate. Similar to the first aspect, the air flow stopping plate divides the passage into a passage through which air attracted from one of the air intake ports flows and a passage through which air attracted from the other of the air intake ports flows, where the air flow stopping plate prevents a collision between the air flows originating from the opposing air intake ports.

According to the above configuration, the air flow stopping plate is provided in the passage and divides the passage into two passages, thereby each respective air flow supplied from the two opposing air intake ports flow to the radiator from the separate passages without interference, and the same effects as earlier explained for the first configuration are obtained.

Furthermore, the air flow stopping plate may be a current plate for rectifying air attracted from two air intake ports. According to the above configuration, the quantity of air supplied from the two air intake ports is further increased, and the interior of the engine room can be cooled with a larger quantity of air; therefore, engine room cooling can be performed efficiently. Accordingly, the quantity of air can be increased; therefore, despite an engine room of a construction machine being smaller, overheating can be effective avoided, whether in regard to an engine, hydraulic devices, or the like which are provided within the engine room.

DETAILED DESCRIPTION OF THE PREFERRED EMBODIMENTS

Preferred embodiments of the present invention will now be described in detail below with reference to the drawings.

Figure 1:
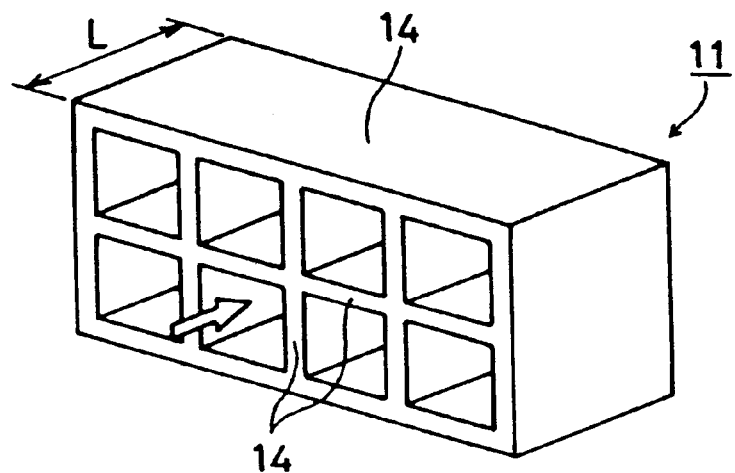
FIG. 1 is a perspective view of a conventional cell-type noise absorbing device.
Figure 2:
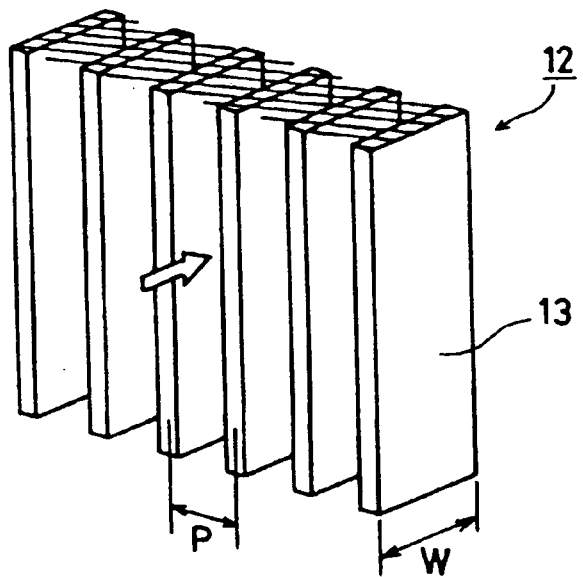
FIG. 2 is a perspective view of a conventional split-type noise absorbing device.

Generally, there are two kinds of configurations of a noise absorbing device, that is, a cell-type noise absorbing device 11 in which noise absorbing plates 14 are combined to be a box shape (see FIG. 1) and a split-type noise absorbing device 12 in which noise absorbing blades 13 are placed in parallel (see FIG. 2). The cell-type noise absorbing device 11 has a ridge line of a longer length relative to an air passage area. Accordingly, even if a length L of the cell-type noise absorbing device 11 is shorter, the surface area of the noise absorbing plate 14 is greater relative to the quantity of air passing therethrough; therefore, the cell-type noise absorbing device 11 has excellent noise absorbing performance. The split-type noise absorbing device 12 has less air passage resistance due to fewer obstacles. In order to improve noise absorbing performance, a width W of the noise absorbing blade 13 is increased, or the surface area of the noise absorbing blade 13 is increased by reducing a pitch P relative to the quantity of air flow.

Figure 3:
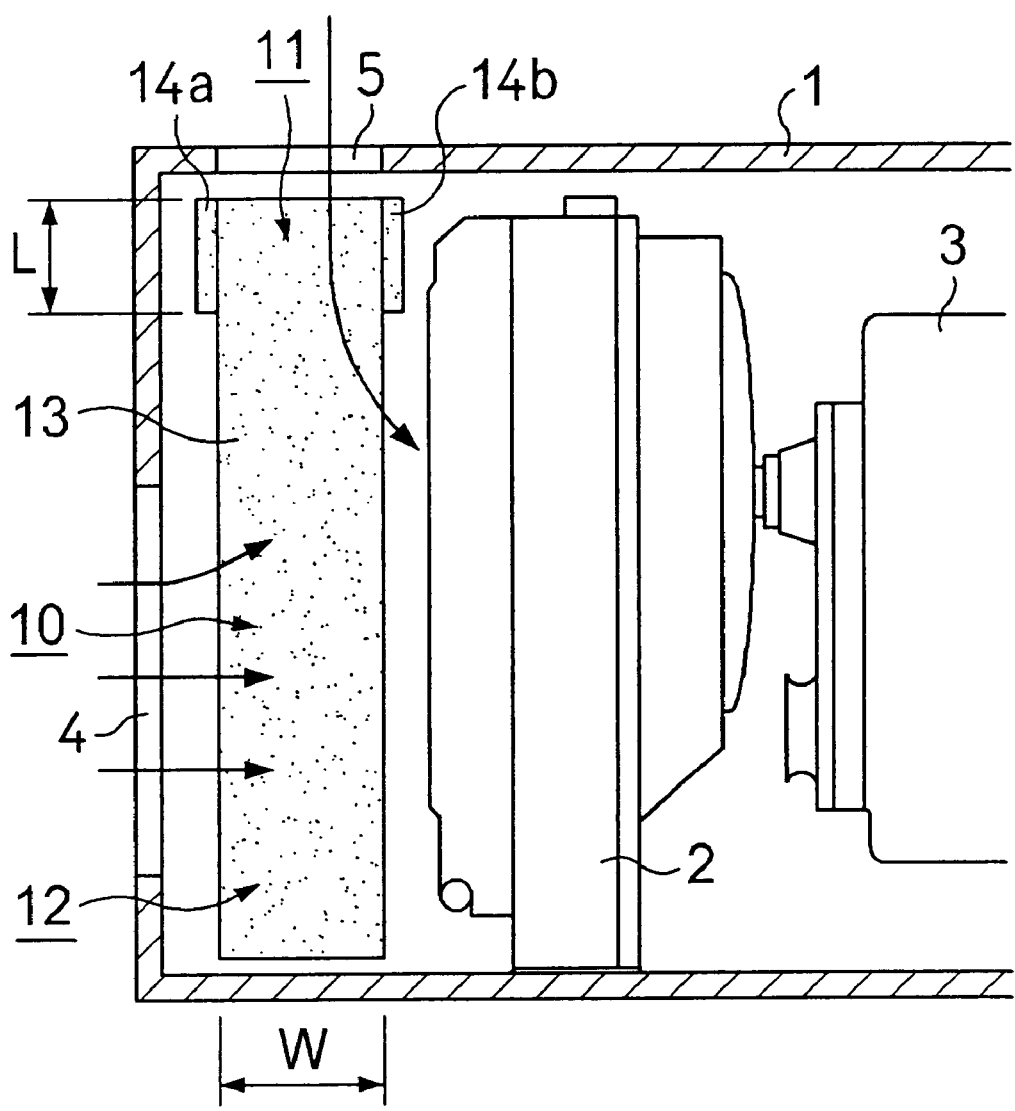
FIG. 3 is a sectional side elevation view of an engine room according to a first embodiment of the present invention.

FIG. 3 is a sectional side elevation view of an engine room 1 according to a first embodiment of the present invention. In the engine room 1, a multi-way noise absorbing device 10, a radiator 2, and an engine 3 are placed in this order from the front. A side air inlet portion 4 and a top air inlet portion 5 are provided at the front surface and the forward portion of the top surface of the engine room 1, respectively. An air passage length L adjacent to the top air inlet portion 5 is shorter than an air passage length (i.e., the width of the noise absorbing blade 13) W of the side air intake portion 4.

Figure 4:
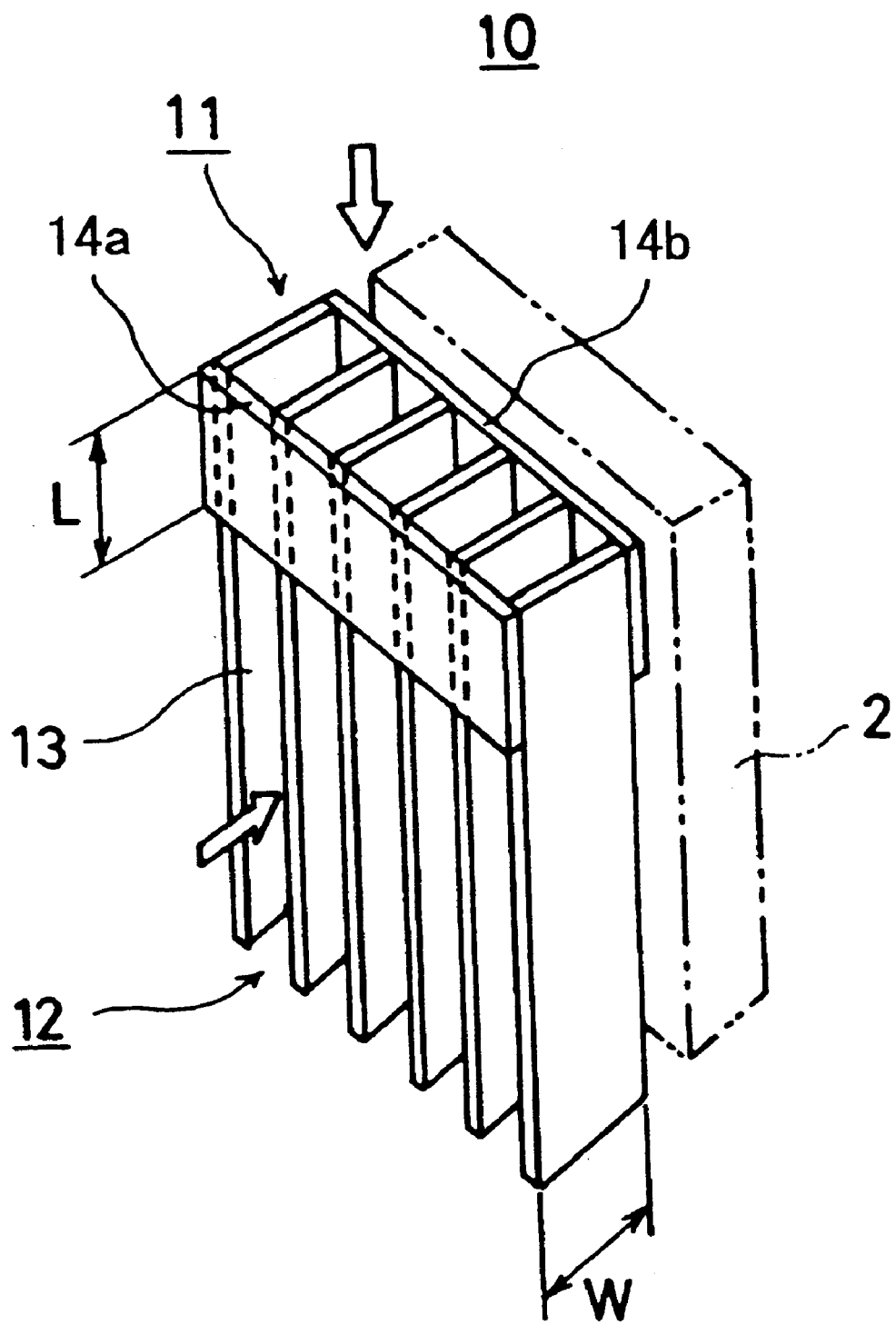
FIG. 4 is a perspective view of the noise absorbing device of FIG. 3.

As shown in FIG. 4, for the noise absorbing device 10, a plurality of noise absorbing blades 13 are vertically oriented and disposed in parallel. In the noise absorbing device 10, the split-type noise absorbing device 12 is formed at the lower portion thereof, and the cell-type noise absorbing device 11 is formed by respectively placing a front noise absorbing blade 14a and a rear noise absorbing plate 14b at the forward and the rearward portions of the upper portion thereof. In such a configuration, the air passage length L of the cell-type noise absorbing device 11 portion is shorter than the width W of the noise absorbing blade 13. The noise absorbing blade 13 is integrally formed of a rigid noise absorbing material 20 (for example, rigid sponge or the like).

Figure 5:
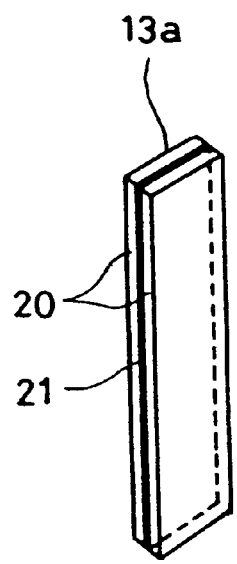
FIG. 5 is a perspective view of a second example of a noise absorbing blade of the first embodiment.
Figure 6:
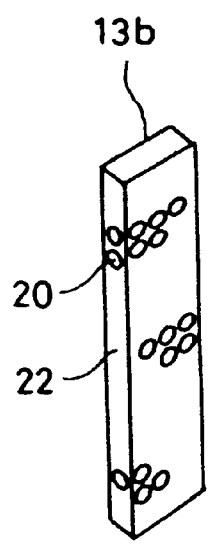
FIG. 6 is a perspective view of a third example of a noise absorbing blade of the first embodiment.
Figure 7:
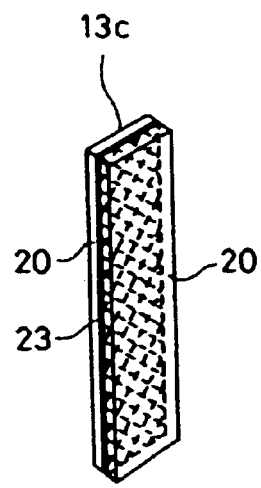
FIG. 7 is a perspective view of a fourth example of a noise absorbing blade of the first embodiment.

The other examples of the noise absorbing blade 13 will be explained. A noise absorbing blade 13a shown in the second example in FIG. 5 is formed by adhering, the noise absorbing material 20 on both sides of a core material 21 having sound insulating properties or air permeability. Accordingly, this second example has greater bending strength and is easy to manufacture. A third example for a noise absorbing blade 13b, shown in FIG. 6, is made by covering the noise absorbing material 20 with an air permeable plate material 22 (for example, a metal plate having a number of perforations). Consequently, the blade 13b has greater strength, thereby a wide selection range of noise absorbing material 20 may be provided. A fourth embodiment of a noise absorbing blade 13c is illustrated in FIG. 7. The blade 13c is made by adhering noise absorbing material 20 on both sides of a core piece material 23 having air permeability (for example, a metal plate having a number of perforations, a wire netting with a number of punched holes being formed therein, or the like) to exhibit excellent noise absorbing qualities. These noise absorbing blades 13, 13a, 13b, and 13c are also applicable to the front noise absorbing plate 14a and the rear noise absorbing plate 14b.

The operation of the first embodiment will be explained with reference to FIG. 3. The side air inlet portion 4 and the top air inlet portion 5 are provided in the engine room 1; therefore, sufficient fresh air is readily available. Due to the width W of the noise absorbing blade 13 being relatively long, noise passing through the side air inlet portion 4 to the outside is sufficiently reduced. In addition, this portion is the split-type noise absorbing device 12; therefore, the air passage resistance is less and the cooling performance is greater. As for the noise going outside from the top air inlet portion 5, the air passage length L is shorter, but the cell-type noise absorbing device 11 is formed, and the noise absorbing performance is improved. Thus, it is possible to provide almost equal noise absorbing performance with the cell-type noise absorbing device 11 portion and the split-type noise absorbing device 12 portion of the absorbing device 10; therefore, higher noise absorbing performance can be obtained.

Figure 8:
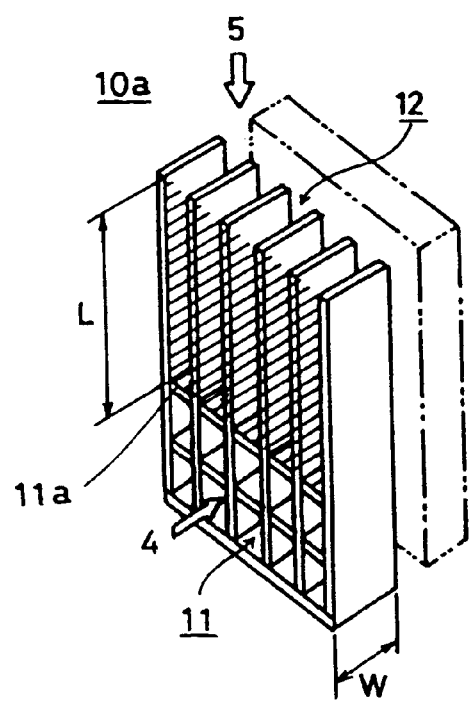
FIG. 8 is a perspective view of a noise absorbing device according to a second embodiment of the present invention.

FIG. 8 is a perspective view of a noise absorbing device 10a of a second embodiment. The air passage length L associated with the top air inlet portion 5 is longer than the air passage length W associated with the side air absorbing portion 4. In the noise absorbing device 10a, the upper portion forms the split-type noise absorbing device 12, and the lower portion forms the cell-type noise absorbing device 11. The operation and the effects are the same as in the first embodiment, and the air flow from the upper portion (the downward arrow in FIG. 8) is prevented from interfering with the air flow from the lower portion (the horizontal arrow in FIG. 8) by a lateral plate 11a composing the lower part of the cell-type noise absorbing device 11; therefore, air flow is obtained with higher efficiency.

Figure 9:
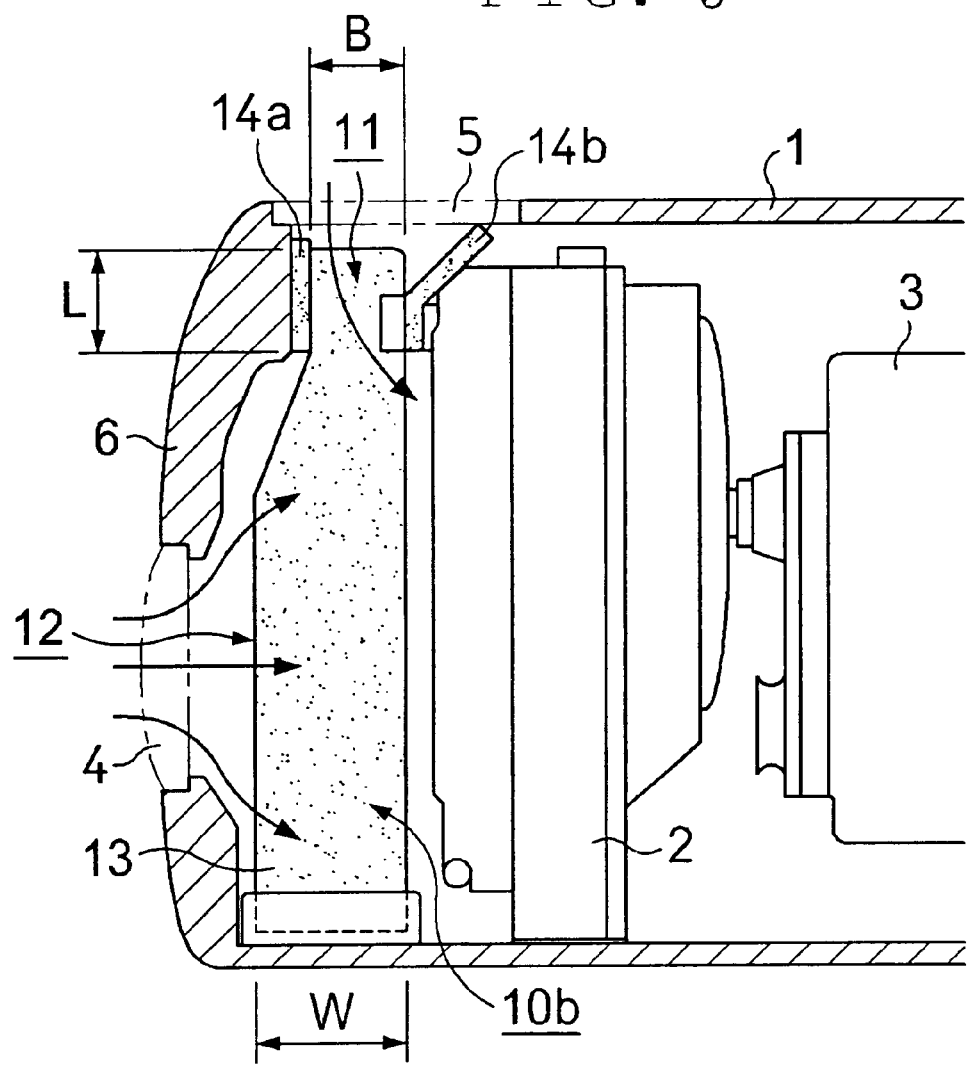
FIG. 9 is a sectional side elevation view of an engine room of a construction machine according to a third embodiment of the present invention.
Figure 10:
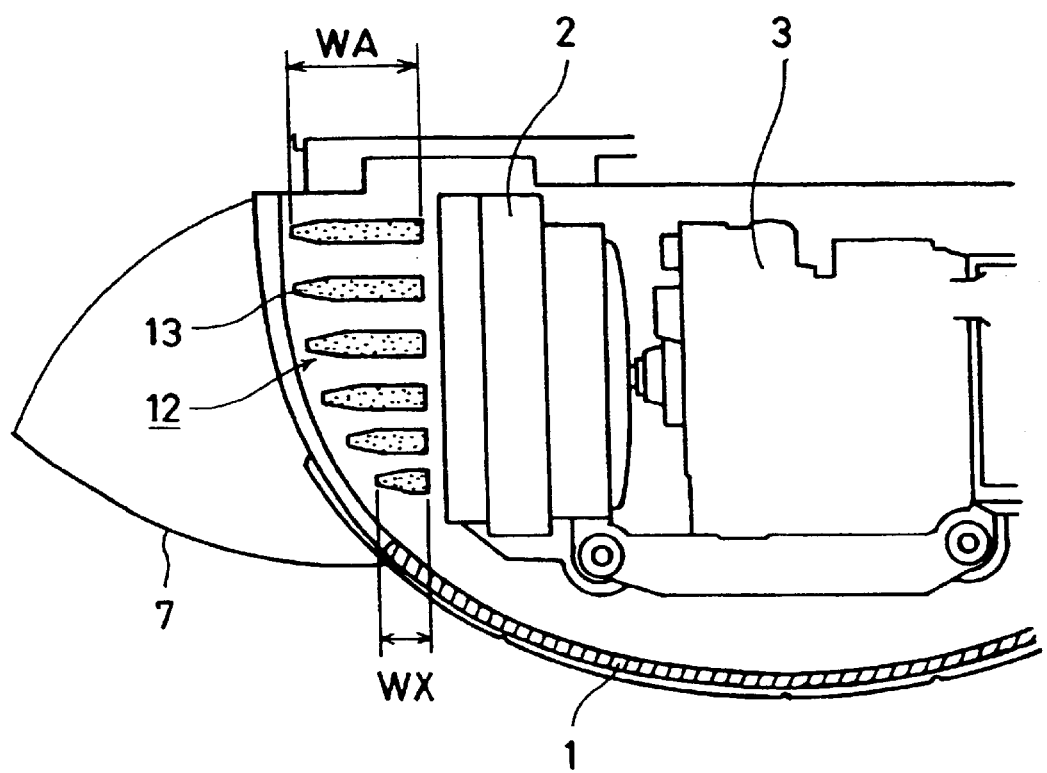
FIG. 10 is a sectional plan view of the engine room of FIG. 9.

FIGS. 9 and 10 relate to a third embodiment of the present invention and show the engine room 1 of a construction machine, for example, a hydraulic shovel. In the engine room 1, a multi-way noise absorbing device 10b, a radiator 2, and an engine 3 are provided in this order from the side surface. In the case of a hydraulic shovel, the engine room 1 is generally placed at the rear portion of an upper revolving superstructure, and at the same time, a counterweight 6 is also placed at the rear portion. For this reason, it is difficult to form the side air inlet portion 4 to be large; therefore, utilization of the top air inlet portion 5 is commonly necessary. The air passage length L associated with the top air inlet portion 5 is shorter than the air passage length W associated with the side air absorbing portion 4 for purposes of air flow with respect to the radiator 2. From the point of the external shape of the construction machine, the air inlet width B at the upper portion of the noise absorbing device 10b is shorter than the width W at the lower portion. The noise absorbing device 10b has a plurality of noise absorbing blades 13 vertically-oriented and placed in parallel. In the noise absorbing device 10b, the split-type noise absorbing device 12 is formed at the lower portion, while the cell-type noise absorbing device 11 is formed by respectively placing the front noise absorbing plate 14a and the rear noise absorbing plate 14a at the forward and rearward portions of the upper portion thereof.

The external perimeter of the engine room 1 has a rounded portion, as shown in FIG. 10, in accordance with the round shape of the rear portion of the upper revolving superstructure of the hydraulic shovel. Consequently, the width W of the noise absorbing blade 13 of the split-type noise absorbing device 12 is gradually changed from a width WA to a width WX in accordance with the round shape. The numeral 7 is an exterior grille which is freely opened and closed.

Figure 11:
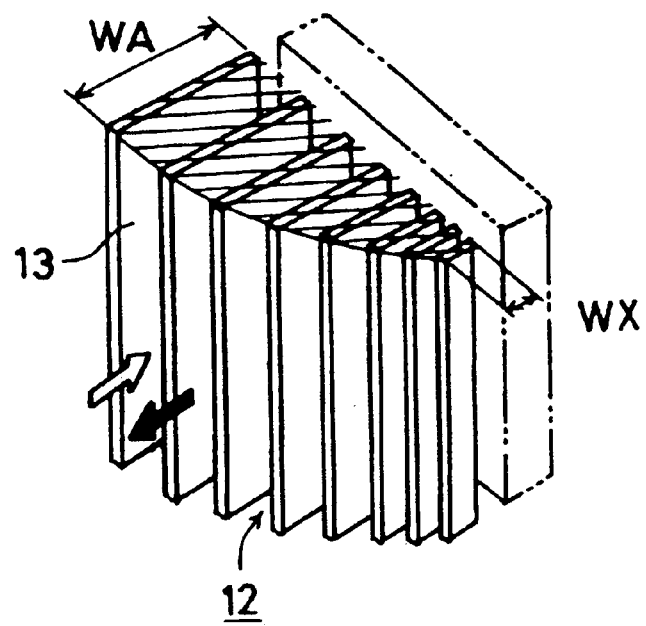
FIG. 11 is a perspective view of a split-type noise absorbing device of according to a third embodiment of the present invention.
Figure 12:
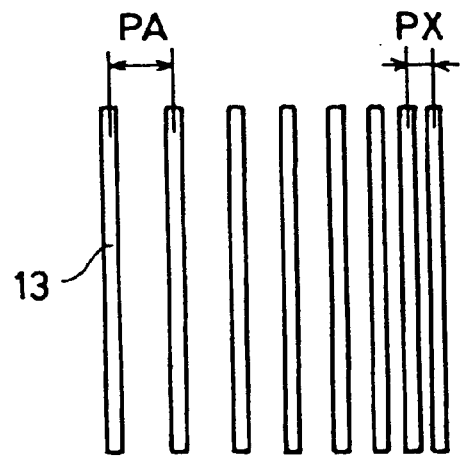
FIG. 12 is a front view of the split-type noise absorbing device of the third embodiment.
Figure 13:
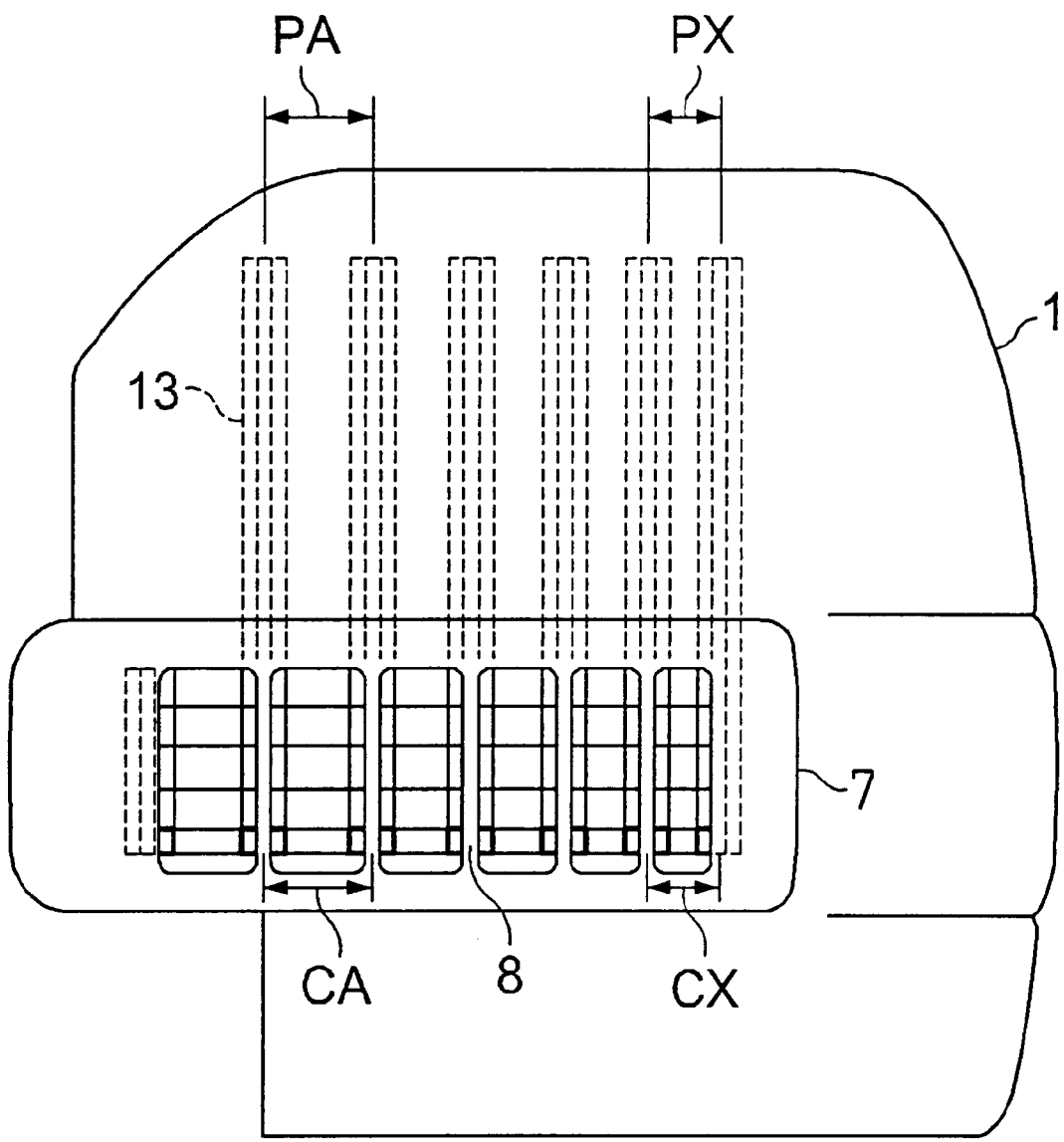
FIG. 13 is a front view of the engine room of FIG. 9.

FIGS. 11 and 12 show the split-type noise absorbing device 12 at the lower portion of the noise absorbing device 10b. As described above, the width W of the noise absorbing blade 13 is successively changed from WA to WX, and WA>WX. Accordingly, the noise absorbing performance is reduced towards the width WX side. Therefore, the pitch P between the noise absorbing blades 13 may be changed in proportion to the width W of an adjacent noise absorbing blade 13. Specifically, in reference to FIG. 12, the respective pitches P are orderly changed from a pitch PA to a pitch PX, and PA>PX. In other words, the width of the air passage is successively changed. Thereby the surface area of the noise absorbing blade 13, relative to the quantity of air flow, is almost equal; therefore, the noise absorbing performance of the noise absorbing blade 13 for each portion is almost the same so that the noise absorbing performance of the entire split-type noise absorbing device 12 is improved. It should be noted that the split-type noise absorbing device 12 is applicable to the inlet side as well as to the outlet side as shown by the arrows in FIG. 11. As further shown in FIG. 13, the pitches PA to PX of the noise absorbing blade 13 may conform to the pitch CA to CX of a vertical grid 8 of the exterior grille 7.

Figure 14:
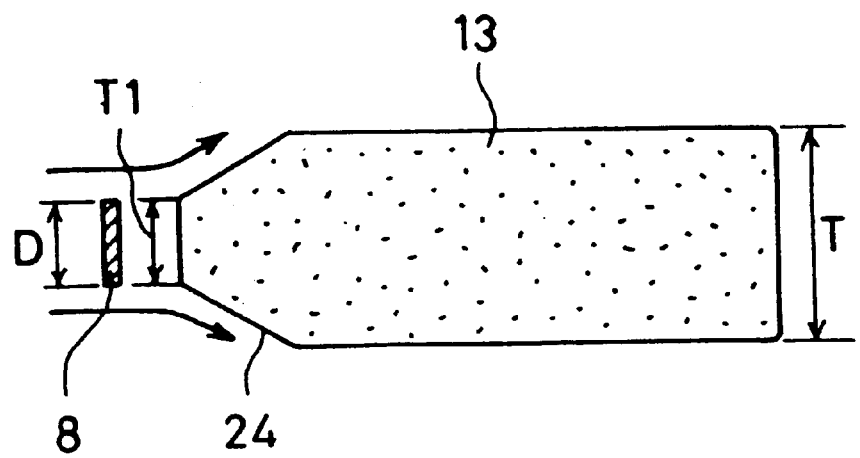
FIG. 14 is a detailed explanatory view of the noise absorbing blade of FIG. 10.

In FIG. 14, the noise absorbing blade 13 has a thickness T1 at a front end portion thereof, which is thinner than thickness T at a rear portion thereof, and a tapering portion 24 formed therebetween and at a forward portion of the noise absorbing blade 13. The thickness T1 is almost the same as the width D of the vertical grid 8, and as described above, the pitches PA to PX of the noise absorbing blade 13 and the pitches CA to CX of the vertical grid 8 conform; therefore, air smoothly flows (as shown by the arrows), and air passage resistance is reduced.

Figure 15:
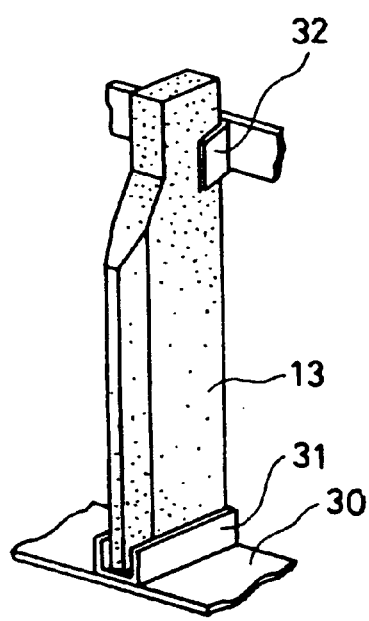
FIG. 15 is an explanatory view of attaching the noise absorbing blade of FIG. 9.
Figure 16:
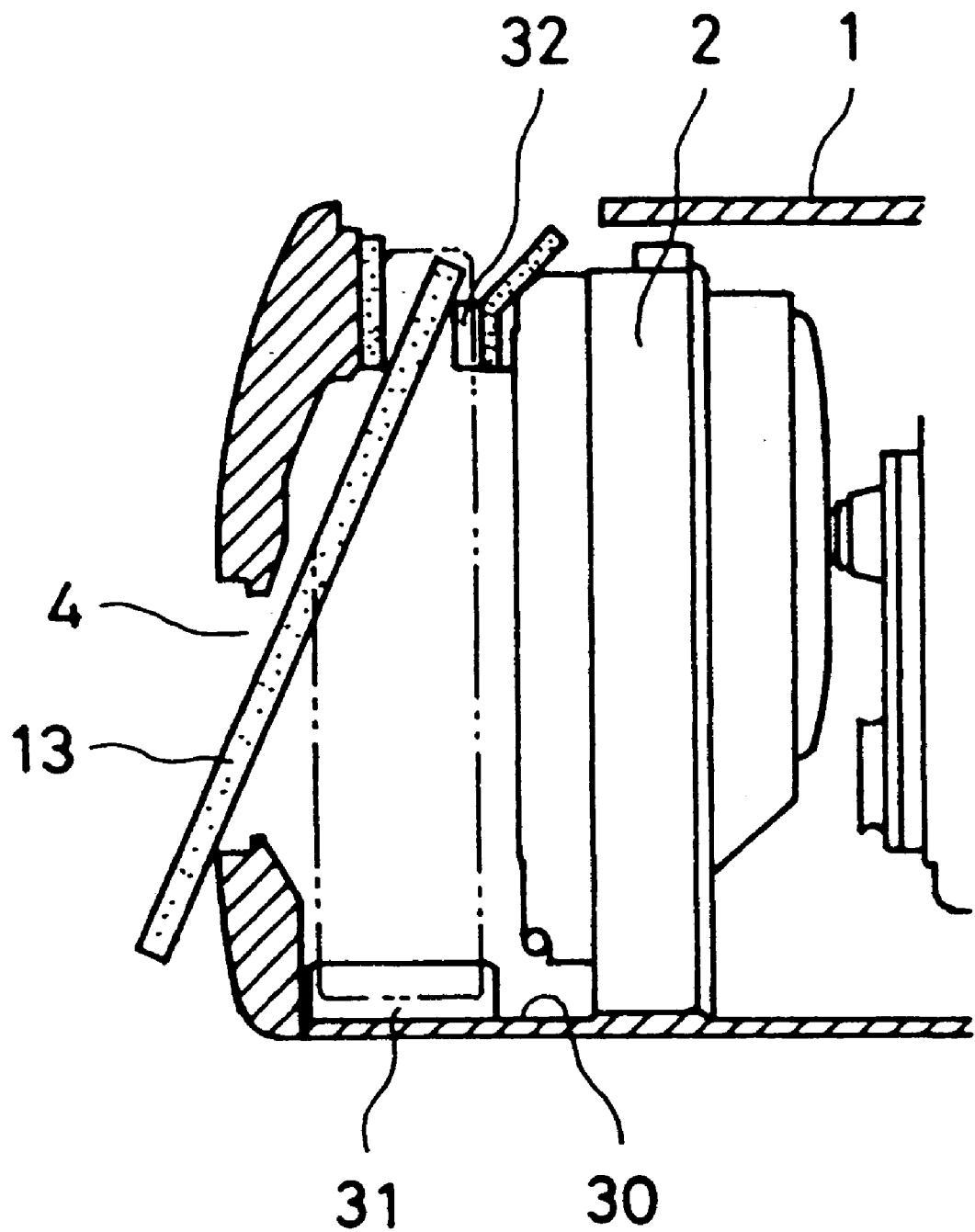
FIG. 16 is an explanatory view of the way to replace the noise absorbing blade of FIG. 9.

In FIGS. 15 and 16, the noise absorbing blade 13 is supported in such a way as the lower end portion thereof is inserted into a lower holder 31 provided on a floor surface of the engine room 1 and the upper portion thereof at the rear edge is inserted into an upper holder 32 attached on the front surface of the radiator 2. As a result, after the exterior grille 7 (see FIG. 10) is opened, the noise absorbing blade 13 can be inserted from the side air inlet portion 4, as shown in FIG. 16, and turned around to be attached at the position shown by the alternate long and two short dashes line. Accordingly, a replacement operation of the noise absorbing blade 13 is extremely easy.

Figure 17:
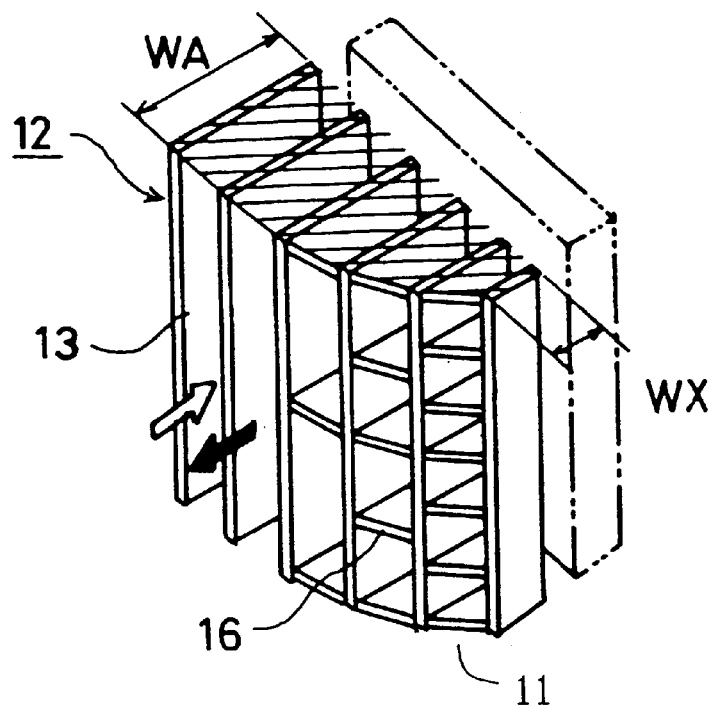
FIG. 17 is a perspective view of another example of the split-type noise absorbing device of the third embodiment.
Figure 18:
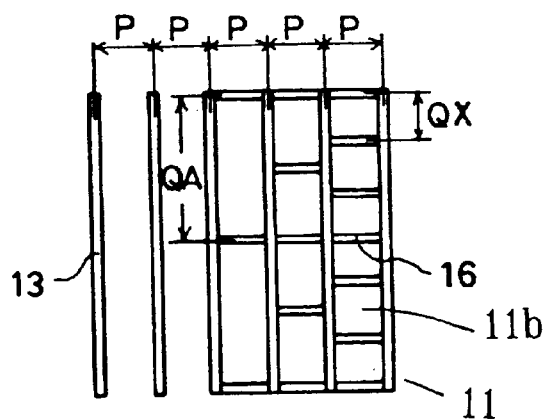
FIG. 18 is a front view of the split-type noise absorbing device of FIG. 17.

FIGS. 17 and 18 show other examples of the split-type noise absorbing device 12 according to a third embodiment.

The width W of the noise absorbing blade 13 is successively changed from WA to WX (WA>WX), but the pitch P is not changed. Rather, lateral noise absorbing plates 16 span between selected noise absorbing blades 13 having portions of a smaller width W to form a cell-type noise absorbing device 11. Pitches Q of the lateral noise absorbing plate 16 are successively changed from QA to QX (QA>QX) in proportion to the widths W of the noise absorbing blades 13. Specifically, the number of cells 11b increases in reverse proportion to the widths W of the noise absorbing blades 13. The operational effects are the same as the noise absorbing device 12 of FIGS. 11 and 12.

Next, a device for taking air into an engine room of a construction machine according to a fourth embodiment of the present invention will be described in detail.

Figure 19:
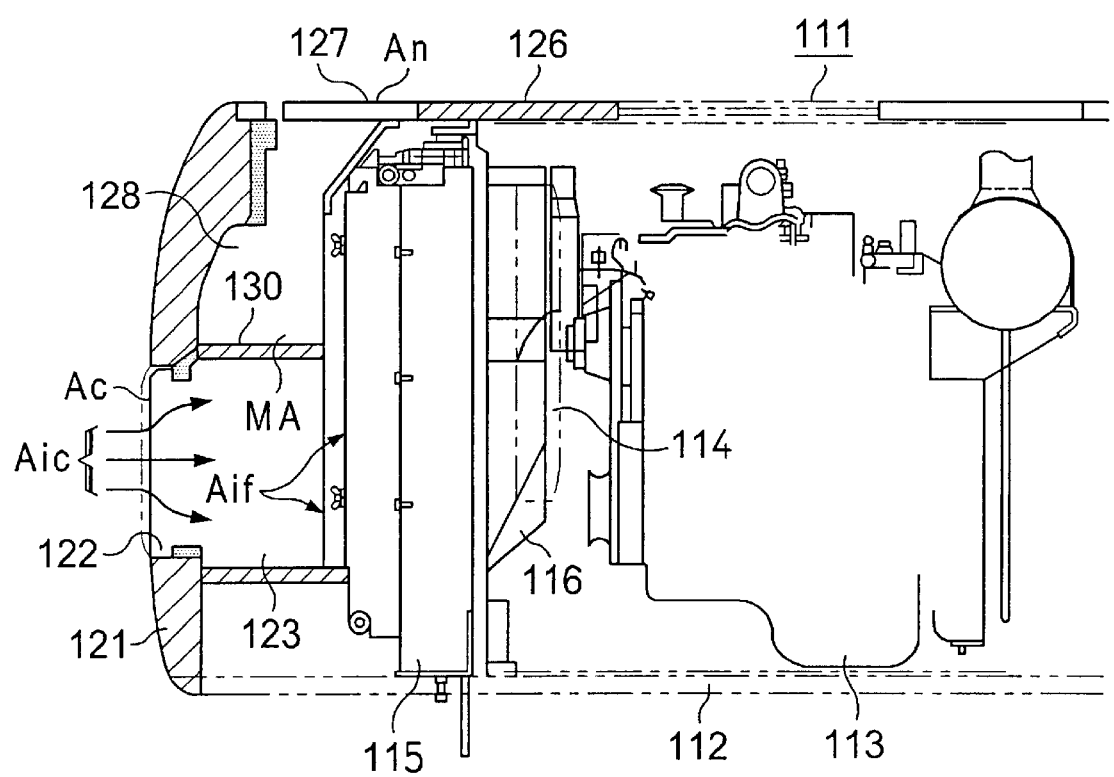
FIG. 19 is a sectional side elevation view of a device for taking air into an engine room according to a fourth embodiment of the present invention and is a sectional view taken along the 19—19 line in FIG. 20.
Figure 20:
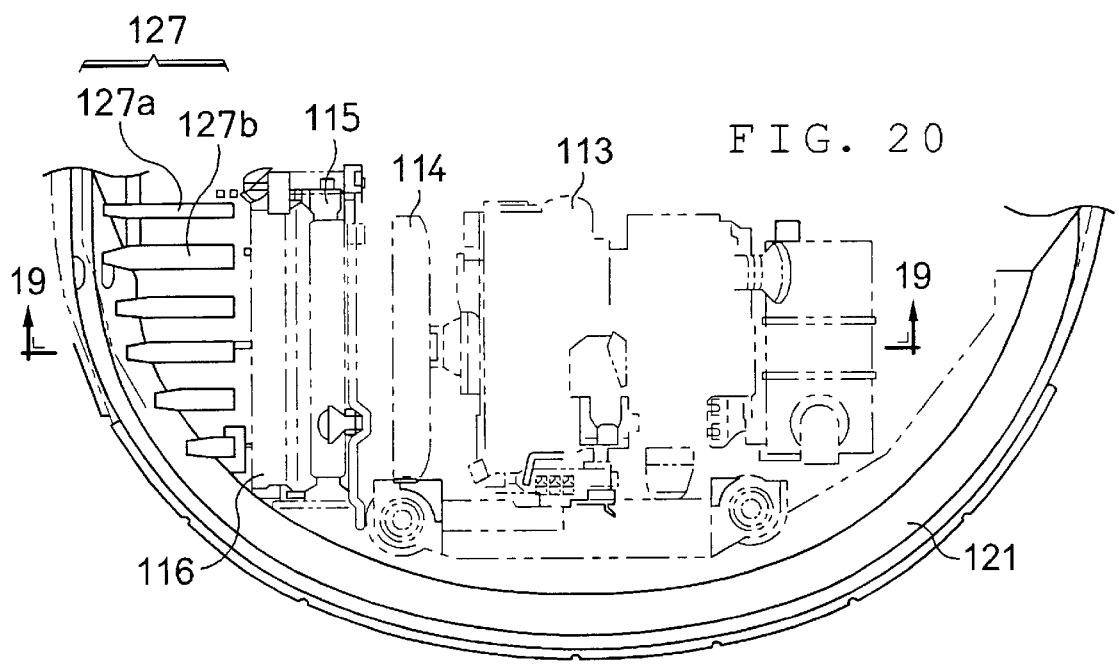
FIG. 20 is a plan view of the device for taking air into an engine room of the fourth embodiment.
Figure 21:
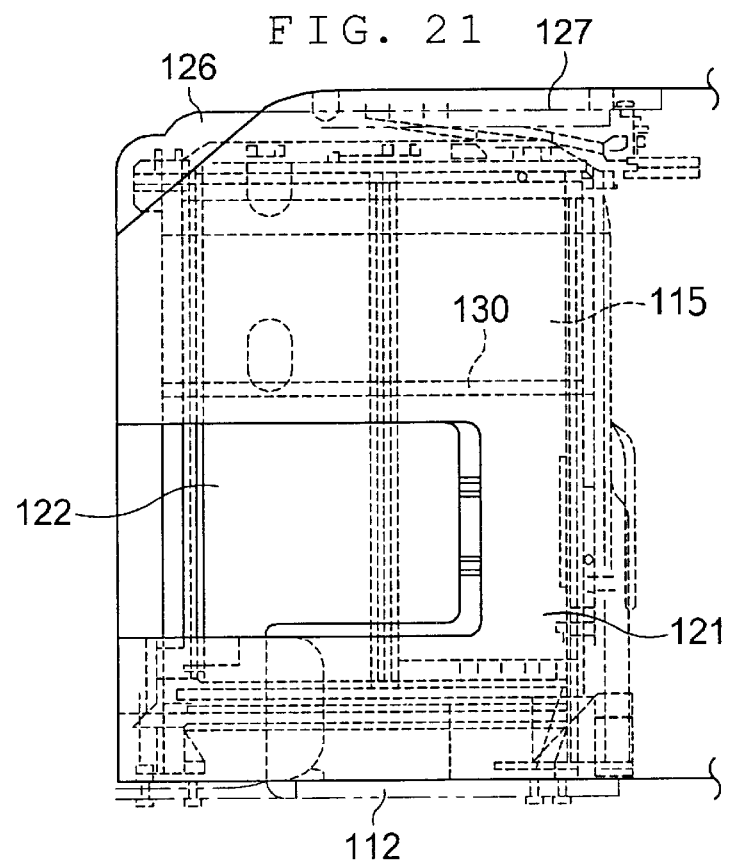
FIG. 21 is a front view of the device for taking air into an engine room of the fourth embodiment.

In FIG. 19 to FIG. 21, an engine 113 in an engine room 111 is attached to an upper revolving superstructure frame 112. A fan 114 which attracts air by being rotationally driven by the engine 113, is placed in front of the engine 113 (in a left direction of FIG. 19). A radiator 115 is placed in front of the fan 114, and water for cooling the engine 113 is cooled with the air attracted by the fan 114. A shroud 116 is placed at the rear portion of the radiator 115. A cooler for air conditioning (not illustrated) is additionally provided at the front of the radiator 115. A counterweight 121 is provided at the front side of the radiator 115, separated from the radiator 115 by a predetermined space, and a counterweight inlet port 122, from which air attracted by the fan 114 flows, extends through the counterweight 121. A counterweight passage 123 is provided at a portion from the counterweight inlet port 122 to the radiator 115.

An engine hood 126 is provided above the radiator 115, separated by a predetermined space, and a hood inlet port 127 extends through the engine hood 126. A hood passage 128 is provided at a portion from the hood inlet port 127 to the radiator 115.

The counterweight passage 123 and the hood passage 128 intersect at a right angle. An air flow stopping plate 130 is provided at a position MA where both the passages intersect. The counterweight passage 123 and the hood passage 128 are separated by the air flow stopping plate 130. The counterweight passage 123 and the hood passage 128 form the respective passages at the front of the radiator 115.

FIG. 19 shows the situation in which the counterweight inlet port 122 and the hood inlet port 127 respectively have openings at one position, but if necessary in order to make excellent external appearance or the like, it may be suitable to provide a plurality of parallel openings, for example, in a slit form, as shown by the numerals 127a, 127b, etc. in FIG. 20. In this case, if a plurality of inlet ports 127a, 127b, etc. are composed of a noise absorber, the noise from the inlet ports 127a, 127b, etc. can be prevented.

The operation of the aforesaid configuration will be explained hereafter.

Returning to FIG. 19, when the engine 113 is operated and the fan 114 is rotationally driven, the fan 114 attracts air from the outside of the engine room 111 and passes the air toward the engine 113 side of the engine room 111. At this time, air Aic from the counterweight inlet port 122 and air Aif from the hood inlet port 127, as attracted by the fan 114, flow in the engine room 111 toward the radiator 115. The air Aic from the counterweight inlet port 122, which passes through the counterweight passage 123, is attracted by the fan 114 by way of the lower side surface of the radiator 115 and flows toward the engine 113, while the air Aif from the hood inlet port 127, which passes through the hood passage 128, is attracted by the fan 114 by way of the upper side surface of the radiator 115 and also flows toward the engine 113. As described above, the counterweight passage 123 and the hood passage 128 are separated by the air flow stopping plate 130; therefore, the air Aic from the counterweight inlet port 122 and the air Aif from the hood inlet port 127 separately pass through the radiator 115 without interfering with the other.

Figure 22:
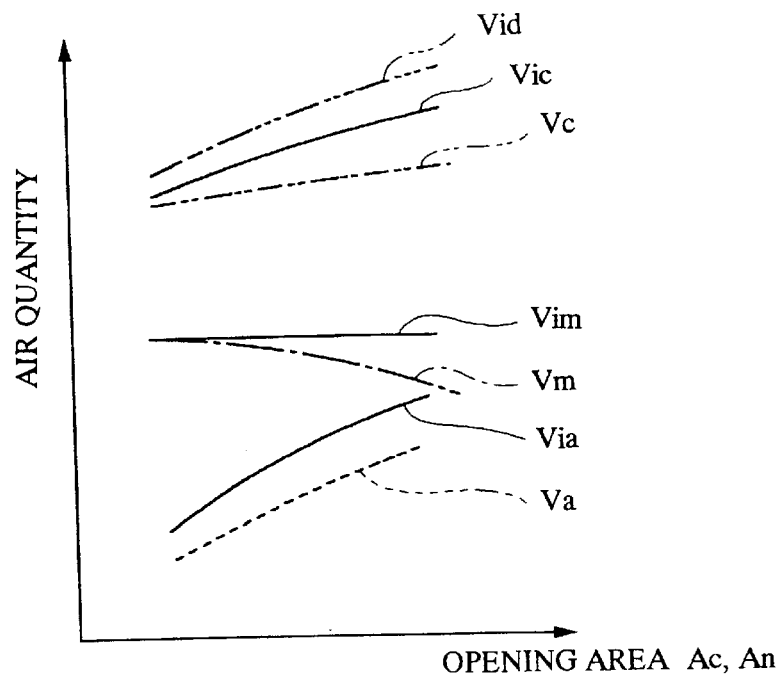
FIG. 22 is a graph explaining the relationship between the opening areas of inlet ports and the quantity of air in the fourth embodiment.

In the above configuration, as described above, changes in the quantity of inlet air is performed by changing an opening area of the auxiliary hood inlet port 127, which supplies a shortage air amount, while an opening area Ac of the main counterweight inlet port 122 is fixed. As a result, as shown in FIG. 22, as the opening, area An increases, a quantity of auxiliary air Via from the auxiliary hood inlet port 127 increases. At this time, the quantity of main air Vim from the counterweight inlet port 122 is substantially fixed, i.e., is provided largely without change. Accordingly, as for the total quantity of air Vic, the quantity of air, which is a result of adding up both of the quantity of air Vim and Via, is obtained.

Figure 23:
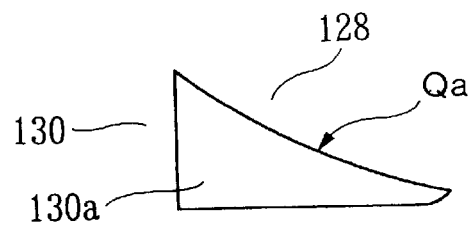
FIG. 23 illustrates a current plate which is another example of a air flow stopping plate according to the fourth embodiment.

Next, as shown in FIG. 23, the air flow stopping plate 130 is formed to be a current plate 130a by providing a curved surface Qa on the hood passage 128 side. As a result, as shown in FIG. 22, the total quantity of air using the current plate Vid increases more than the total quantity of air Vic. This is because the quantity of auxiliary air Via flowing through the hood passage 128 from the hood inlet port 127 increases. In this way, by eliminating stagnation and disturbance of the quantity of auxiliary air Via, the total quantity of air can be increased.

The aforesaid fourth embodiment shows an example of the placement in which the counterweight passage 123 is orthogonal to the hood passage 128 by providing the face of the counterweight inlet port 122 in parallel with the face of the radiator 115 and providing the face of the hood inlet port 125 perpendicular to the face of the counterweight inlet port 122. However, the vertical placement is not limited to the example shown in FIG. 19.

Figure 24:
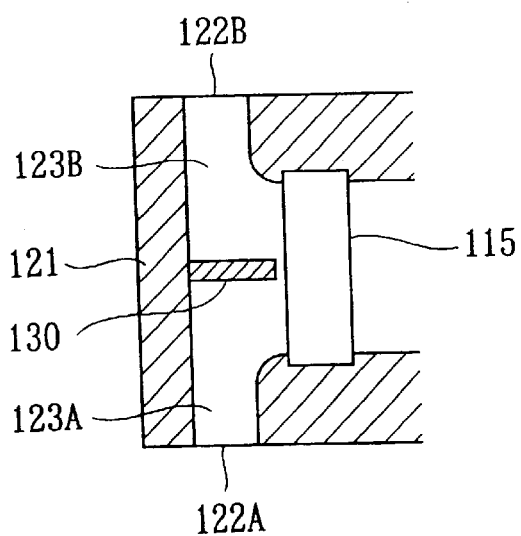
FIG. 24 is an explanatory view of another example of the placement of the inlet ports according to the fourth embodiment.
Figure 25:
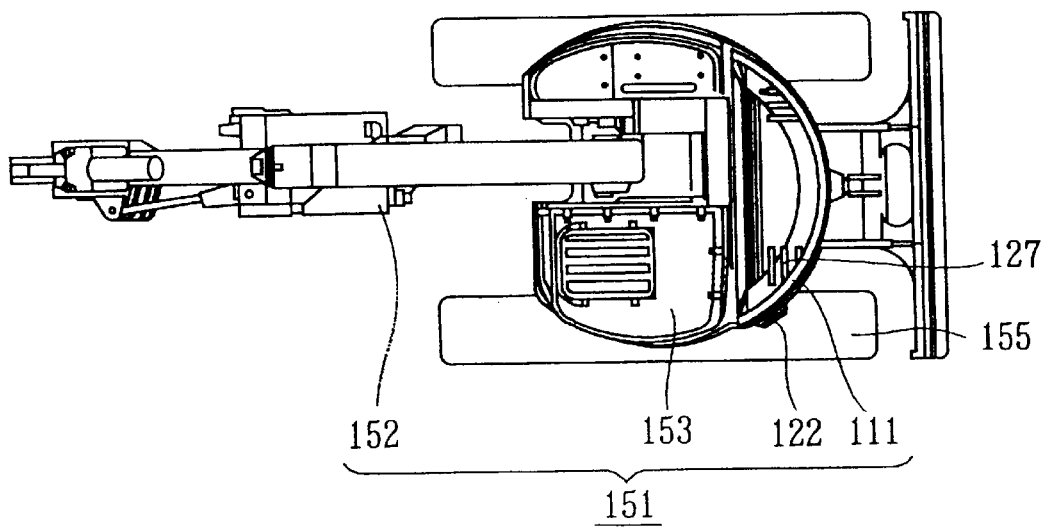
FIG. 25 is a plan view of a conventional, ultra-small, revolving-type hydraulic shovel.
Figure 26:
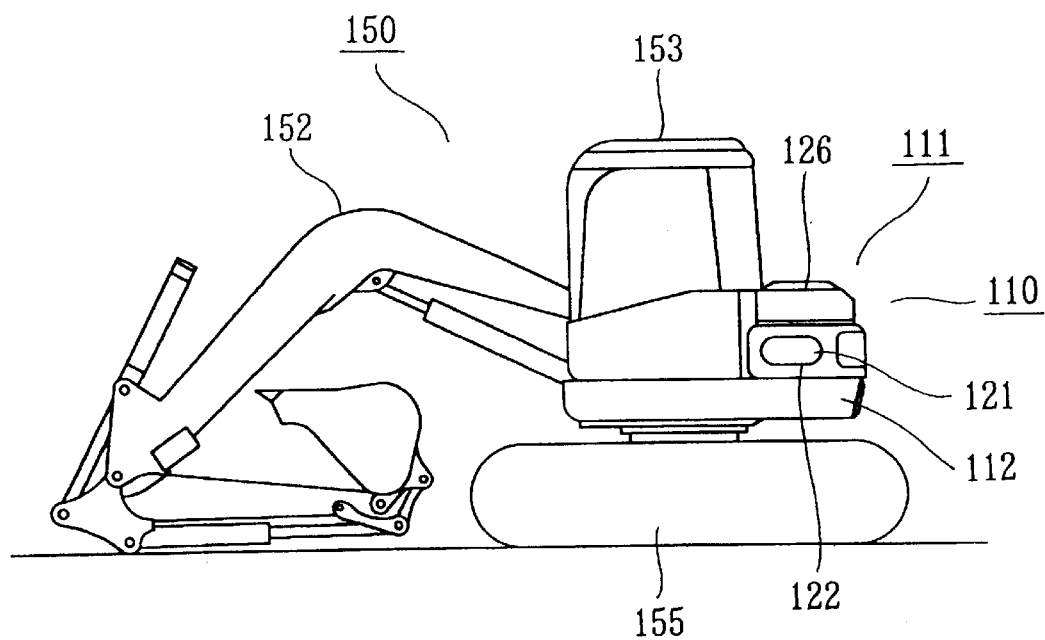
FIG. 26 is a side elevation view of the hydraulic shovel of FIG. 25.

For example, as shown in FIG. 24, the same effects can be obtained even when the face of a first counterweight inlet port 122A and the face of a second counterweight inlet port 122B are provided in a direction perpendicular to the face of the radiator 115, where a first counterweight passage 123A and a second counterweight passage 123B are placed to face each other. Explaining with reference to FIG. 19, when inlet ports are provided at the engine hood 126 and the revolving superstructure frame 112, and the inlets ports are placed to face each other, the same effects are also obtained.

It should be further noted that regarding the orthogonal placement or the placement in a perpendicular direction, such angle is not limited to 90 degrees, and the same effects are also obtained if the angle is not less than 60 degrees. The placement facing to each other is not limited to the situation in which the faces of two inlet ports are parallel to each other, but the angle may be adjusted as necessary.

What is claimed is:

1. An engine noise reduction device to receive air flow from a first air inlet and at least a second air inlet, where the first air inlet enters an engine chamber in a first direction, the second air inlet enters the engine chamber in a second direction, and the first direction differs from the second direction, the device comprising:
    a split-type noise absorbing portion having an air passage of a first length, the split-type noise absorbing portion provided to oppose and receive an air flow from the first air inlet portion; and
    a cell-type noise absorbing portion having an air passage of a second length, the cell-type noise absorbing portion provided to oppose and receive an air flow from the second air inlet portion,
    wherein the first length is greater than the second length.

2. A device in accordance with claim 1, wherein the split-type noise absorbing portion includes at least one noise absorbing blade.

3. A device in accordance with claim 1, wherein the cell-type noise absorbing portion includes at least one noise absorbing blade.

4. A device in accordance with claim 1, wherein the split-type noise absorbing portion and the cell-type noise absorbing device each include a plurality of noise absorbing blades.

5. A device in accordance with claim 4, wherein at least one noise absorbing blade is formed of a rigid, noise absorbing material.

6. A device in accordance with claim 4, wherein at least one noise absorbing blade has at least one noise absorbing material layer bonded to a layer having at least one characteristic of a group including sound insulation and air permeability.

7. A device in accordance with claim 4, wherein at least one noise absorbing blade has at least one noise absorbing material layer substantially covered by an air permeable layer.

8. A device in accordance with claim 1, wherein the first direction is oriented substantially ninety degrees with respect to the second direction.

9. A device in accordance with claim 1, wherein the first direction opposes the second direction.

10. An engine noise reduction device for a construction vehicle having an engine chamber, where the device receives an air flow from a first air inlet, where the first air inlet extends through an upper surface of the engine chamber, and an air flow from at least a second air inlet, where the second air inlet extends through a side of the engine chamber; the engine noise reduction device comprising:
    a split-type noise absorbing portion having an air passage of a first length, and a cell-type noise absorbing portion having an air passage of a second length.

11. A device in accordance with claim 10, wherein the split-type noise absorbing portion further includes a plurality of vertically-oriented noise absorbing members, and the cell-type noise absorbing portion further includes a plurality of noise absorbing members.

12. A device in accordance with claim 11, wherein the split-type noise absorbing portion opposes and receives the air flow from the second inlet, and the cell-type noise absorbing portion opposes and receives the airflow from the first inlet.

13. A device in accordance with claim 11, wherein the split-type noise absorbing portion opposes and receives the air flow from the first inlet, and the cell-type noise absorbing portion opposes and receives the airflow from the second inlet.

14. A device in accordance with claim 11, wherein a width of each noise absorbing member of the cell-type noise absorbing portion is less than a width of any noise absorbing member of the split-type noise absorbing portion.

15. A device in accordance with claim 11, wherein a width of each noise absorbing member of the split-type noise absorbing portion generally and successively conforms with a shaping of a surface of the engine compartment.

16. A device in accordance with claim 15, wherein a spacing between adjacent noise absorbing members of the split-type noise absorbing portion is proportional to a change in width of the adjacent noise absorbing members.

17. A device in accordance with claim 15, wherein a spacing between adjacent noise absorbing members of the split-type noise absorbing portion is constant.

18. A device in accordance with claim 17, wherein a cell configuration of the cell-type noise absorbing portion is determined in accordance with a change in width of the adjacent noise absorbing members of the split-type noise absorbing portion, and wherein a number of cells increases in inverse proportion to the change in width of the adjacent noise absorbing members of the split-type noise absorbing portion.

19. A system for delivering air to an engine room of a construction machine, the system comprising:

a fan;

an air flow passage positioned forward of the fan;

a first air inlet and at least a second air inlet, wherein each air inlet is in fluid communication with the air flow passage, and the fan operatively draws air through each air inlet and into the air flow passage; and an air flow stopping plate positioned within the air flow passage, wherein said air flow stopping plate divides the air flow passage into a first passage, through which air from the first air inlet passes, and a second passage, through which air from at least the second air inlet passes, and prevents a combination of the air from the first passage and air from the second passage, and wherein the first air inlet is oriented at substantially a right angle relative to at least the second air inlet.

* * * * *